July 28, 1959  J. G. HANSEN ET AL  2,896,845
MECHANICAL CHARACTER DISPLAY DEVICE FOR ELECTRONIC MEANS
Filed July 16, 1958  7 Sheets-Sheet 1

INVENTORS: JOHN G. HANSEN
ROBERT H. RUGABER
JOSEPH P. WELSH
BY Francis E. Blake
ATTORNEY

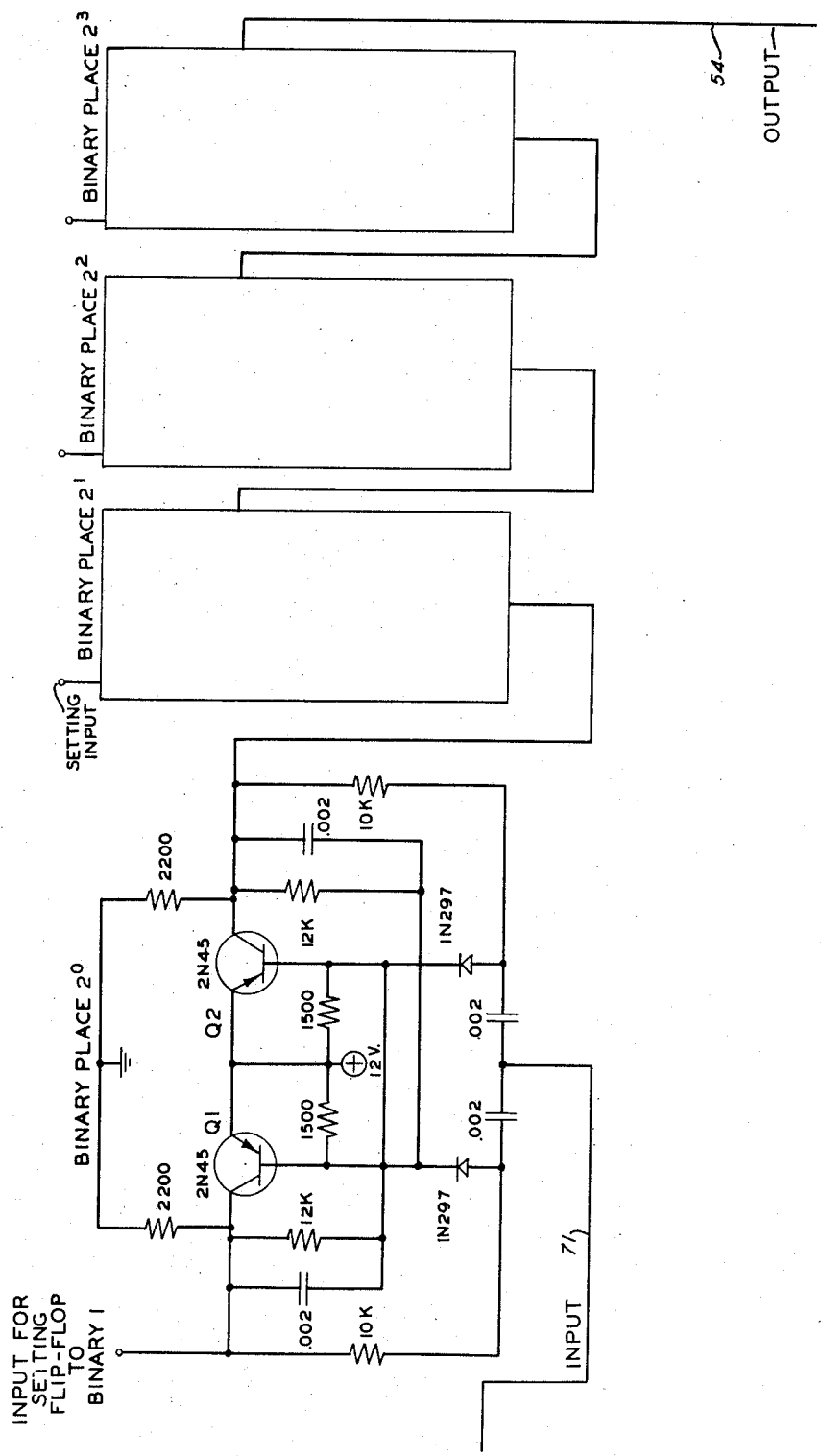

FIG. 6

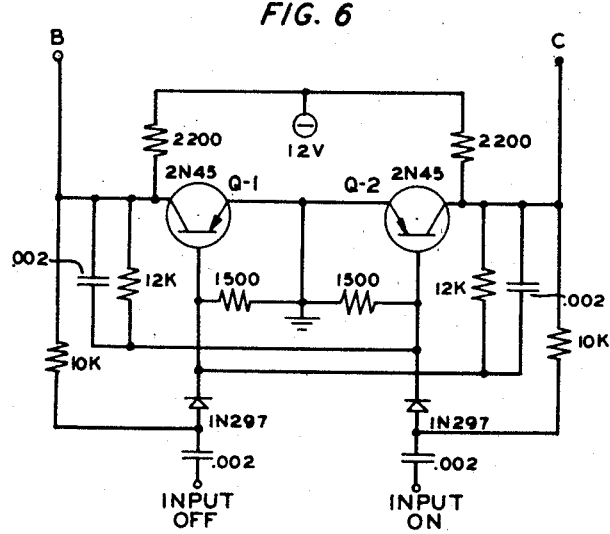

WHEN FF IS ON, BY POSITIVE
PULSE APPLIED TO ON INPUT,
OUTPUT TERMINAL B IS UP,
AND TERMINAL C IS DOWN

IN NORMAL OFF CONDITION
Q-2 IS CONDUCTING, C IS UP
AND B IS DOWN

FIG. 7

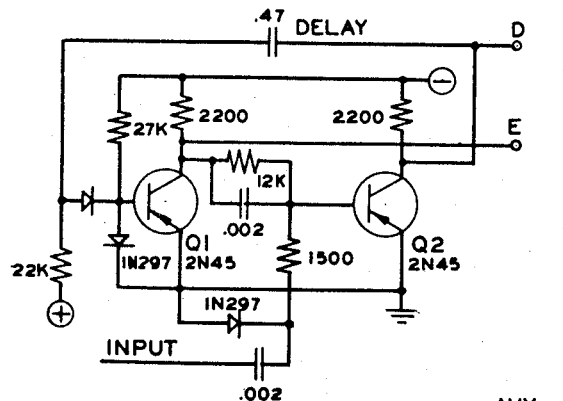

DMV
DELAY MULTIVIBRATOR
Q-2 NORMALLY CONDUCTING
D NORMALLY UP
E NORMALLY DOWN

POSITIVE PULSE ON INPUT
REVERSES CONDITIONS OF Q-1
AND Q-2 FOR CHARGING TIME
OF DELAY CONDENSER

FIG. 8

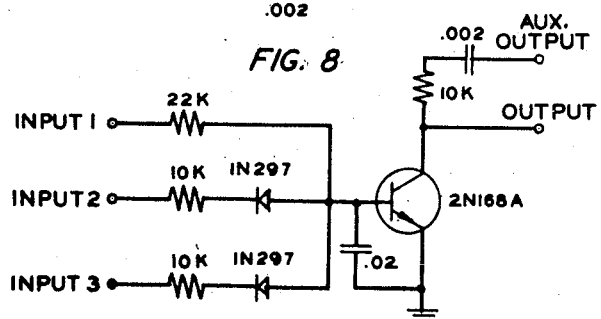

COMMUTATOR GATE
ALL THREE INPUTS MUST BE
POSITIVE TO ENABLE
TRANSISTOR

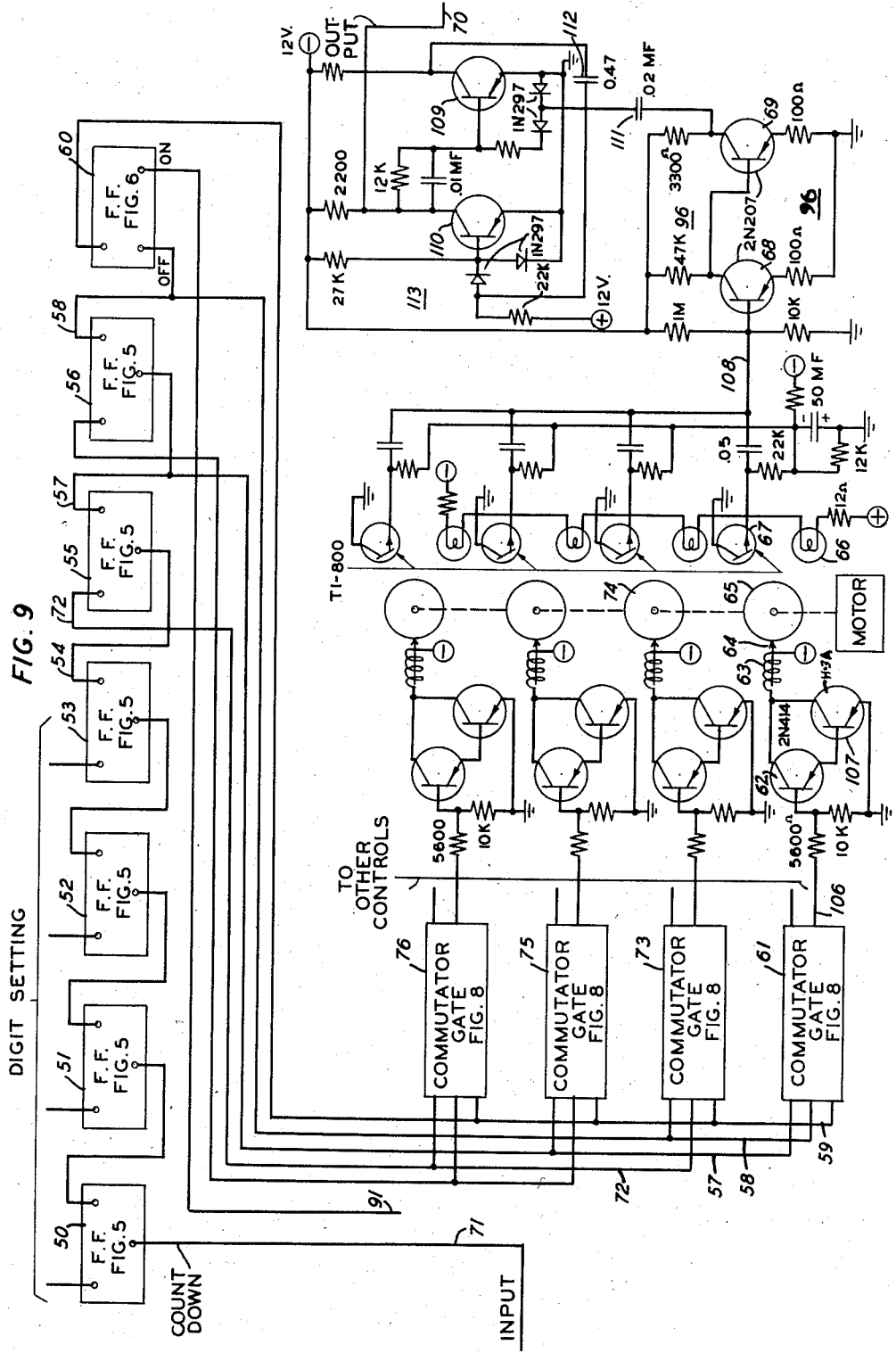

July 28, 1959  J. G. HANSEN ET AL  2,896,845
MECHANICAL CHARACTER DISPLAY DEVICE FOR ELECTRONIC MEANS
Filed July 16, 1958  7 Sheets-Sheet 5

FIG. 10

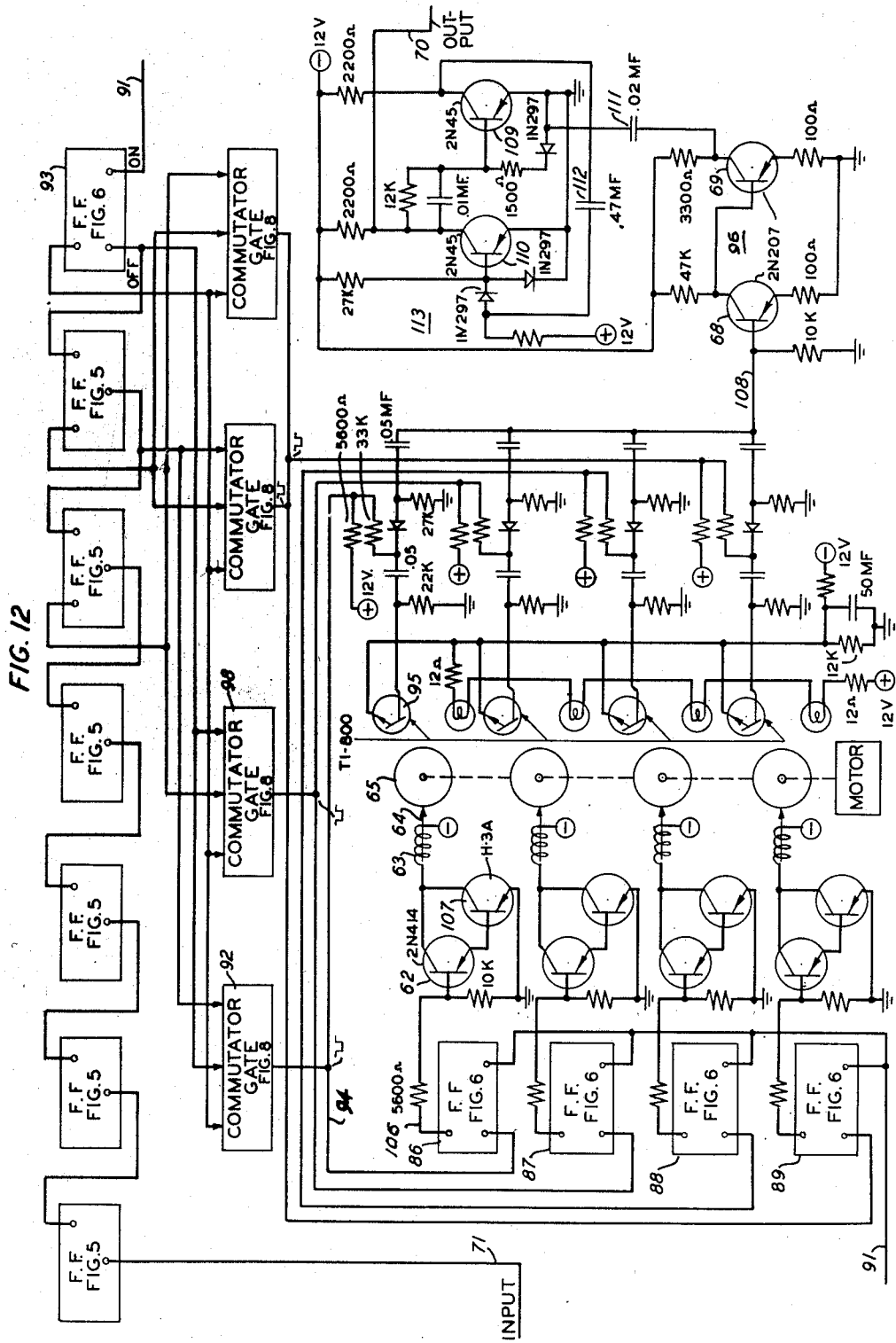

United States Patent Office 2,896,845
Patented July 28, 1959

2,896,845

MECHANICAL CHARACTER DISPLAY DEVICE FOR ELECTRONIC MEANS

John G. Hansen, Pittsford, and Robert H. Rugaber and Joseph P. Welsh, Rochester, N.Y., assignors to General Dynamics Corporation, Rochester, N.Y., a corporation of Delaware Application July 16, 1958, Serial No. 748,946

11 Claims. (Cl. 235—132)

This invention relates to indicator devices and particularly to high speed means for displaying results produced by electronic means such as digital computers.

The object of the invention is to provide a mechanical number indicator having a plurality of number wheels which may be rotated at high speed and which may be controlled in their movements and selectively halted by electronic control means in the proper positions to display a given multidigit number.

Basically the invention consists of a constantly rotating shaft on which a plurality of small light weight wheels are mounted by means of slip clutches having tooth-like like projections or tabs on the side thereof, in between which a pin may be plunged when the wheel has reached a desired position to halt further movement thereof thus positioning the wheel for the display of a number.

The invention is characterized by tooth-like projections on the side thereof, the surfaces of which have been plated and polished to constitute a plurality of mirrors equal in number to the number of characters to be displayed and equally spaced whereby flashes of light reflected from a source of light to a photosensitive device, such as a phototransistor, may be used to count the number of peripheral increments of movement of the wheel and to control the plunging of said stop pin when the desired advance has been made.

The invention is further characterized by the provision of a lengthy break in the said succession of mirrored projections, constituting an extra long time space in the succession of control flashes, this being used as a signal means to mark the proper starting of the counting of the said succession of flashes.

The invention also includes a deal of circuitry whereby the digits of a number are made available in succession to the mechanical number wheel device whereby each wheel is set in turn. The circuitry for controlling this operation consists of a translator fundamentally one such as that disclosed in the copending application of Gerald R. Paul, Serial Number 704,486, filed December 23, 1957, where, digit keys depressed, each produces an electronic condition resulting in the transmission of a train of digital pulses such as those employed in telephone working. The transmitting register of such a device, consisting essentially of a cascaded plurality of flip-flops, is set by the said keys and is then counted down to a normal or standard condition, a pulse being transmitted on each of said counts. Similarly, in the present device, a register is set and as the said wheel revolves, thereby producing a succession of flashes, which are counted, the counting thereof is used to count down the said register until a normal or standard condition is reached whereupon the wheel is stopped and in that position will act to display the corresponding digit. In both cases the flip-flop representing the binary 8 bit upon changing from a binary 1 to a binary 0 transmits a signal denoting that the count down is complete.

It will be particularly noted however that in the former case where the register to be counted down is adapted to telephone working, 0 is actually a train of ten pulses and each other digit is represented by a corresponding number of outgoing pulses. In the present case, the number of pulses representing each digit is not strictly the same as the value of the digit but the digits are placed in their natural order with the result that one count down pulse will represent the digit 0 and ten count down pulses will represent the digit 9. Thus the count down register is set to the fifteen's complement of the desired decimal digit which is the inverse of the binary equivalent of the decimal digit to be displayed.

Each operation of a number wheel consists of a withdrawal of the stop pin, an acceleration period of the wheel during which the wheel lightly gripped by the slip clutch begins to move and then comes up to full speed after which its advance is measured by counting the flashes produced by reflection from the mirrored tabs on the wheel and then a sudden stop as the pin is plunged between two of the stop tabs on the wheel when the proper count is reached. Thus the wheel is mechanically halted in position to display a given digit.

The invention is further characterized by the use of a common control circuit which is used for each number wheel in succession, a plurality of commutator gate circuits being used to successively connect each flash responsive circuit thereto whereby the stopping of each wheel is controlled by the succession of flashes produced by itself.

A feature of the circuitry of the present invention is the means employed to detect the speed of rotation of a wheel, employed to start the counting operation only after the wheel has accelerated to the proper speed. This feature is embodied in the use of a delay circuit which may be adjusted to produce a circuit movement of any given length, such delay circuit being in the nature of a pulse stretcher and being herein known as a delay multivibrator. This circuit responds to a short duration positive pulse and produces a stretched output pulse of a predetermined length. By applying the wheel pulses to two circuits in multiple, one of which leads to such a DMV and by using the DMV to open a gate to a control component such as a flip-flop, a wheel pulse will be conducted thereto only when the wheel has accelerated to the speed where the flashes succeed one another at a speed great enough so that two such flash produced pulses occur within the stretched pulse from the said DMV. Thus, when two wheel pulses occur within the period of a stretched pulse, the second will pass through the open gate and will constitute a signal for the circuitry to respond to the following pulses for the purpose of first detecting the long space to establish the point for starting the counting and for thereupon counting the pulses until the preset counter has been run down to a point where a stop signal is transmitted.

Thus, when the wheel begins to move and as it is picking up speed, a gate is opened simultaneously with the starting of each pulse but is closed again before the next pulse is transmitted so that no signal may pass through this opened gate until the speed becomes great enough to transmit a succeeding pulse therethrough before the gate is closed.

In accordance with another embodiment of the invention all the wheels may be arranged to be started simultaneously and then each stopped in turn, thus saving the wheel acceleration time for all the wheels excepting the first. There is sufficient time between the stopping of a wheel and the operation of the means for detecting the starting point of the next counting operation to reset the counter for such next count.

Another feature of the present invention is the circuit known as the space detector. This circuit again includes a pulse stretcher, or, as it is known herein, a DMV.

In this case the output pulses of the DMV are sufficiently long so that as the pulses occur a condition will be established to produce a single signal for any given train of pulses but which will terminate when a space of a given length occurs in such train of pulses. Hence, the relaxation of the DMV between groups of pulses is taken as a signal to start counting the pulses of a second group when they occur.

In accordance with this feature an integrating means is employed to produce a single long pulse or signal from a plurality of stretched pulses following one another with due regularity but which will terminate during the said space between trains of pulses. This is roughly analogous to the known action of what is known as the second slow relay in step by step telephone working.

The electronic means for producing this integrated signal consists of a pulse stretcher, or DMV, and a rectifier circuit responsive thereto for controlling a gate circuit whereby the wheel pulses may be gated to the counter at the beginning of a train of wheel pulses, for the characters on the tread of the wheel are spaced therein in accordance with the length of the train by which the digital value is expressed.

Other features will appear hereinafter.

The drawings consist of seven sheets having twelve figures, as follows:

Fig. 5 is a schematic circuit diagram showing a single flip-flop in detail and three others in block form cascaded thereto to constitute a binary counter;

Fig. 6 is a schematic circuit diagram of a two input flip-flop circuit which may be used as an On and Off device;

Fig. 7 is a schematic circuit diagram of a delay multivibrator by which an incoming pulse may be translated into a stretched output pulse of any desired length;

Fig. 8 is a schematic circuit diagram of a commutator gate circuit having a plurality of incoming controls each and every one of which must be positive before the output becomes operative;

Fig. 9 is a schematic circuit diagram showing the binary counter and the control means whereby the four wheels are separately started and employed to produce trains of pulses for the purposes of the present invention;

Fig. 10 is a schematic circuit diagram which takes the wheel output pulses produced by the means of Fig. 9 and examines them for the speed of the wheel, then acts to detect the proper place to start the counting and thereafter transmits them to the input of the counter;

Fig. 12 is a schematic diagram partly in block and partly in circuit showing how it may be arranged to start all wheels simultaneously and stop them separately, thus saving the acceleration times of all excepting the first.

Figure 1:
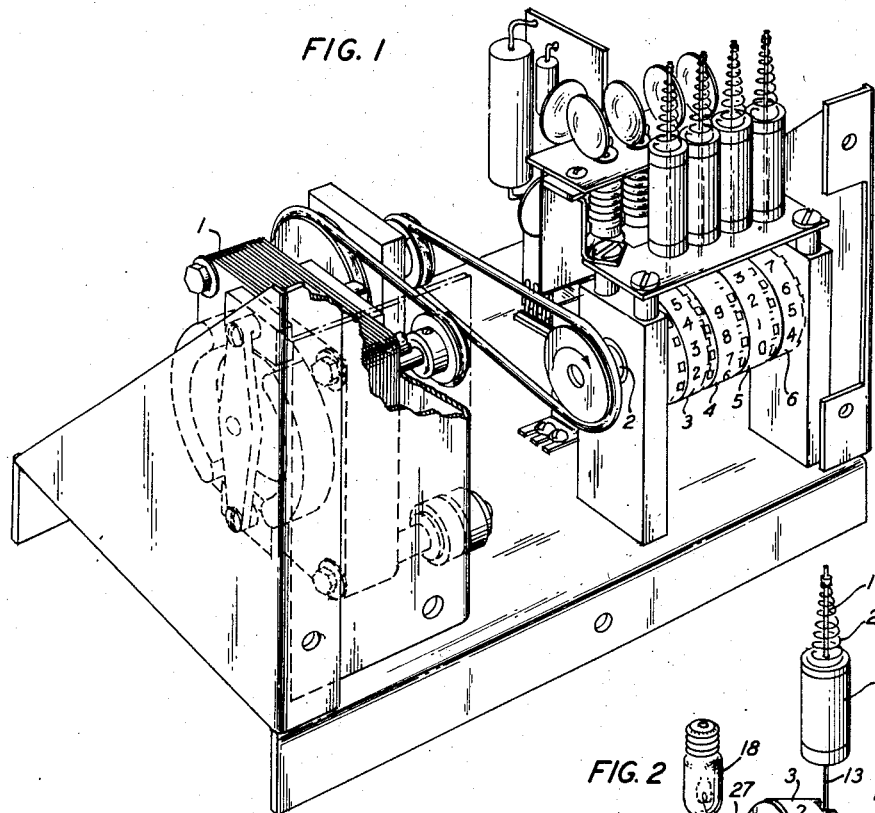
Fig. 1 is a general perspective view of a device constructed in accordance with the principles of the present invention and includes four number wheels, though it will be understood that for at least some of the purposes for which the device may be used a very much larger number of such wheels will be used.
Figure 2:
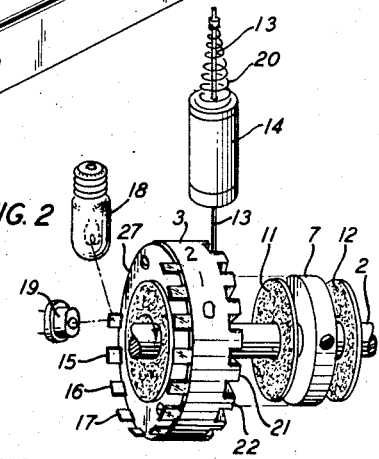
Fig. 2 is a schematic view partly in perspective and partly exploded to explain the basic operations thereof.

Fig. 1 is actually a perspective view of a model, constructed and successfully operated to demonstrate the feasibility of the mechanical number wheels of the present invention. A synchronous motor 1 is provided to drive a shaft 2 constantly. A number of wheels 3, 4, 5 and 6 are loosely mounted on the shaft but are not driven thereby. A plurality of rings, such as 7 in Fig. 2, 8 and 9 in Fig. 4, and 10 in Fig. 3, may be adjustably fixed to the shaft. Between each such ring and the adjacent face of a number wheel, a felt washer 11 or 12 is placed and by the adjustment of the position of the rings, sufficient frictional engagement between the rings and the wheels is established so that when a pin 13 is withdrawn from its normal position the wheel may be driven by the shaft. It will be recognized that when such a pin is withdrawn, and depending on the pressure of the two felt pads 11 and 12, the character of the surfaces of the wheel and the mass thereof which constitutes a factor in the inertia of the wheel, the time it takes for a wheel to accelerate from standstill to rotation at the speed of rotation of the shaft 2 will vary. This is not critical but is a factor in the overall speed at which the device may be set. Whereas the electronic circuits used for control are capable of very high speed operation it has been found that even where it takes several revolutions of the shaft before the wheel attains the same speed, the four wheels shown may be set in turn all in less than one second which is quite satisfactory for the purposes of observation.

In operation, under control of the electronic circuitry hereinafter described, the first operation is the energization of a solenoid or winding 14 which acts to withdraw the pin 13 from engagement with the wheel 3 whereupon the frictional engagement between the shaft 2 and the wheel 3 through the felt washers, such as 11 and 12, causes the wheel 3 to begin its movement and to accelerate until its rotation reaches the same speed as the shaft.

On one side of the wheel a plurality of mirrors 15, 16, 17 and so on, are placed by which light from a source 18 may by reflection be caused to sweep across the face of a phototransistor 19 so that in the rotation of the wheel 3 the phototransistor will be subjected to a train of flashes which may be counted thereby. By any suitable means, the phototransistor 19 may be mounted to be in a position to detect these flashes at proper positions in the rotation of the wheel 3 so that when a proper count is obtained the solenoid or winding 14 may be deenergized and the pin 13, by means of the spring 20, will be plunged between a pair of the tabs, such as 21 and 22.

Figure 3:
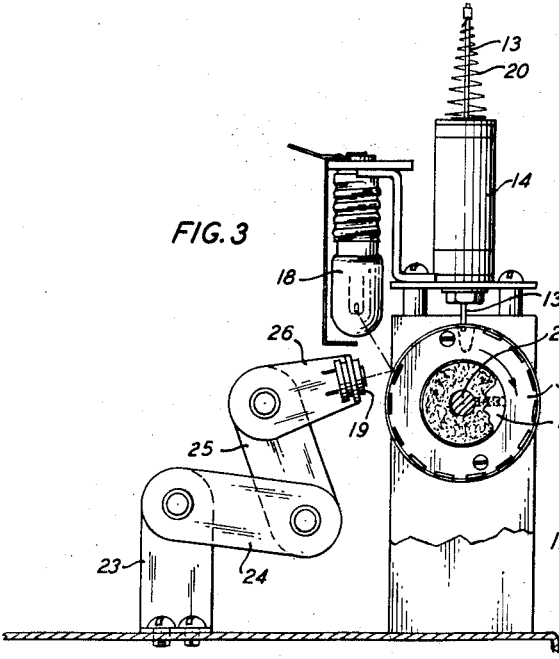
Fig. 3 is a side view with certain parts broken away to show how a phototransistor may be mounted and aimed to become properly responsive to flashes of light reflected from the mirrored wheel tabs as such wheel reaches a position where the stop pin may be plunged between a pair of stop tabs to hold the wheel stationary for the display of a given digit.
Figure 4:
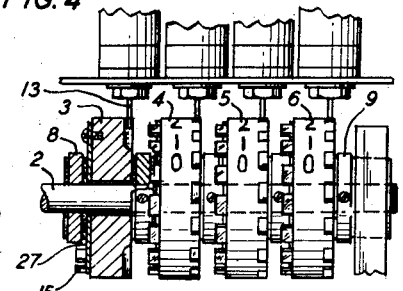
Fig. 4 is a detail front view of the four number wheels, partly in section, to show the cooperative relationship of the wheels and their stop pins.

In Fig. 3 a practical mounting for the phototransistor is shown as a series of flat metallic arms 23, 24, 25 and 26, lightly riveted together and each capable of rotary movement about the rivet by which it is joined to another. The riveting is tight enough to maintain the position to which these arms are forced so that the position to which the phototransistor 19 is finally adjusted may be maintained thereafter.

The wheel 3 may be of any given material but is herein shown to be constructed of some plastic material such, for instance, as hard rubber as this material provides a small mass capable of rapid acceleration when the wheel is freed by the withdrawal of the pin 13. Recesses indicated in Figs. 3 and 4 may be milled in one face of the wheel to practically form the tabs 21 and 22. It will be recognized that these wheels may be formed in any convenient manner, as by way of example, by moulding.

Likewise the reflectors 15, 16 and 17 may be formed in any convenient manner and may be placed at any desired angle to provide the sweeping beam of light across the face of the phototransistor 19. As shown herein, a metallic plate 27, generally in the form of a flat ring, is provided with a series of square shaped tabs which may be bent into positions where their faces are each in a plane parallel to the axis of the shaft 2, is attached to the wheel 3. These tabs are polished or plated to provide good reflecting surfaces.

The principle of operation of these wheels is similar in many respects to the principle of translating the operation of digital buttons into trains of pulses such as those used in telephone working. As each wheel rotates, the flashes produced thereby are counted by the phototransistor 19 and therefore a digital manifestation (of any nature) must be translated into something capable of being matched by this counting of the said flashes.

For this purpose a register, essentially consisting of a cascade of flip-flop circuits having a single wire trigger circuit input is used, so that each flash may be translated into a one step advance of the said register. Such a cascade of flip-flop circuits is essentially of a binary nature and will successively advance to represent decimal digits expressed in binary code. In the present arrangement, where the ten digits 0–9 inclusive are displayed in their natural order on the tread of the number wheel, the register to be counted down is set to the binary representation of the fifteen's complement of the desired digit, whereby the number of angular increments in the rotation of the wheel is proportional to the value of such desired digit, being in fact $X+1$. The following table shows the digit to be displayed, its fifteen's complement, the binary representation thereof and the number of pulses used to count the register down to where the 8 bit changes from 1 to 0.

| Decimal Digit | 15-Digit | Binary Eqv. | Pulses Counted |
|---|---|---|---|
| 0 | 15 | 1 1 1 1 | 1 |
| 1 | 14 | 1 1 1 0 | 2 |
| 2 | 13 | 1 1 0 1 | 3 |
| 3 | 12 | 1 1 0 0 | 4 |
| 4 | 11 | 1 0 1 1 | 5 |
| 5 | 10 | 1 0 1 0 | 6 |
| 6 | 9 | 1 0 0 1 | 7 |
| 7 | 8 | 1 0 0 0 | 8 |
| 8 | 7 | 0 1 1 1 | 9 |
| 9 | 6 | 0 1 1 0 | 10 |

Thus, if it is desired to set a number wheel to display the digit 7, the register is set to 15— 7, or 8. Therefore, if a pulse is fed into this register for each flash detected by the phototransistor 19, then eight such pulses will advance the setting of the register to zero position, as follows:

Register is set at       0 0 0 1
1 pulse advances it to  1 0 0 1
2 pulses advance it to  0 1 0 1
3 pulses advance it to  1 1 0 1
4 pulses advance it to  0 0 1 1
5 pulses advance it to  1 0 1 1
6 pulses advance it to  0 1 1 1
7 pulses advance it to  1 1 1 1
8 pulses advance it to  0 0 0 0

The reaching of this last setting constitutes a stop signal, the employment of which will be more fully set forth hereinafter.

Thus a means is provided which is responsive to a digital train of pulses to respond to a similar series of flashes to set a number wheel to display a corresponding digit.

Fig. 5 is a schematic showing of a binary counter constructed of a cascade of transistorized flip-flop circuits. For purposes of circuit description it may be stated that when the transistor Q–2, by way of example, is conducting (at which time the other transistor will be in the non conducting state) its collector will be Up, that is, at substantially the potential of its emitter, whereby the output of this flip-flop connected to the next in line flip-flop will be Up. When a positive pulse is applied to the input of this flip-flop, it will act to reverse the condition of the two transistors, that is, Q–1 will become conducting and Q–2 will go to the non conducting state whereby the collector of Q–2 will move Down and since the movement of the input of the next in line flip-flop is from Up to Down, such next flip-flop will not be triggered. That is, when the flip-flop designated binary place $2^0$ is driven by an incoming pulse from its state expressing binary 0 to its state expressing binary 1, the next in line flip-flop is not affected. However, when another positive pulse is received over the input wire this binary place $2^0$ flip-flop will be driven from its condition expressing binary 1 to its condition expressing binary 0, at which time its output wire will move from Down to Up and this, constituting a positive pulse, will drive the next binary place $2^1$ flip-flop from its normal condition expressing binary 0 to its opposite condition expressing binary 1.

Each of these flip-flop circuits has an input wire for setting the flip-flop to binary 1 whereby the counter may be set to express any desired number in binary notation in the manner and for the purposes hereinbefore set forth.

Fig. 6 is a circuit very much like the flip-flop of Fig. 5, excepting that it has two separate inputs, one marked On and the other marked Off. In this circuit the condition of the transistor Q–1 will correspond to that one of the two inputs which was last employed. Thus, if a positive pulse had been transmitted over the input On, then the transistor Q–1 would be in a conducting state and in which the output terminal B would be Up and the output terminal C would be Down.

Fig. 7 is a delay multivibrator commonly known as a DMV. In this circuit the transistor Q–2 is normally in a conducting condition. When a positive pulse is applied to the input terminal, the condition of the two transistors will be reversed as in a single shot multivibrator, but the recovery to a normal condition will be delayed until the delay condenser connected to the output terminal D is charged. The output terminal D is normally Up and the output terminal E is normally Down.

Fig. 8 is known as a commutator gate circuit but partakes of the characteristics of a coincidence (And) circuit since it is required that all three inputs be Up. This circuit consists of an NPN transistor arranged to conduct through the base of a transistor in the wheel start-stop circuits which form part of the wheel assembly shown in Fig. 1. The inputs to the base of the present NPN transistor come from three flip-flops comprising the commutator counter stage, one of which is the flip-flop of Fig. 6 and two others of which are cascaded from the output of the binary counter Fig. 5. These three flip-flops control four of the gate circuits in sequence to properly stop the four number wheels.

In practice, and as indicated in Fig. 9, the output of this transistor finds a circuit through the base of a wheel transistor 62 to a source of positive potential so that as all three inputs of this gate circuit go Up, the output thereof goes Down to practically ground potential thus activating the wheel transistor by this effectively negative pulse.

Fig. 9 is a schematic circuit diagram in which a plurality of blocks representing details hereinbefore described are used and which may be used to describe the manner in which the four wheels are successively set. In a manner to be more fully explained hereinafter, when the circuits are ready for the setting of the four number wheels, the counter comprising the four flip-flops 50, 51, 52 and 53 will be set to represent a given digit and a start pulse will be transmitted over the conductor 91. Since at this time the two flip-flops 55 and 56 are at normal, their right hand outputs will be Up and hence an Up condition will be present on the conductors 57 and 58. Therefore, when the start pulse is applied to conductor 91 the flip-flop 60 will go to On and the terminal connected to wire 59 will go Up or positive. Since all three inputs to the commutator gate 61 are now positive, this gate will enable the transistor therewithin whereby the conductor 106 will become more negative and the transistor 107 will be enabled, in turn enabling the wheel transistor 62 whereupon the collector current of transistor 62 will flow through the solenoid 63 to withdraw the pin 64 from the wheel 65 and this wheel will begin to rotate.

As the wheel 65 rotates, the light from the lamp 66 will be reflected in beams sweeping across the face of the phototransistor 67 and each flash will be translated thereby into a positive pulse transmitted over wire 108 into the pulse amplifier consisting generally of the two transistors 68 and 69 whereby amplified positive pulses are delivered to a single shot multivibrator consisting of the normally active transistor 109 and the control transistor 110. Upon the delivery of a pulse to the base of transistor 69 its collector goes Up thereby producing a positive pulse transmitted through the condenser 111 which activates the transistor 110 to raise its collector Up thereby producing a positive output pulse on the conductor 70. This output pulse will be maintained until the condenser 112 becomes charged, thus allowing transistor 109 to resume normal operation.

At this time it is only necessary to state that such pulses will pass through a wheel speed discriminator and space detector so that as the wheel attains the proper speed the space detector then acts to operate a gate to apply the pulses to the input 71 of the counter. Thereupon the counter is counted down as hereinbefore stated and as all four of the flip-flops 50—53 reach a zero setting the next flip-flop 55 is triggered to On whereupon the Up condition of conductor 57 is changed to Down and the Down condition of conductor 72 is changed to Up. As conductor 57 goes Down, the gate 61 is changed to an Off condition and the solenoid 63 is deenergized with the result that the pin 64 is plunged into a recess of the wheel 65 and the wheel is stopped to display a numeral corresponding to the number of pulses transmitted over the input wire 71 to count the counter down.

As the conductor 72 goes to Up the next gate 73 is conditioned. Circuitry is provided to reset the counter to a new digital value so that as the next wheel 74 comes up to speed, the counter will be ready for the next operation in the same manner.

Thus the four gates 61, 73, 75 and 76 are operated in turn. The complete count down of the fourth digit will act to return both of the flip-flops 55 and 56 to normal whereupon a positive pulse is transmitted over the conductor 58 to the off input of the flip-flop 60 so that the positive potential is removed from conductor 59 thus disabling all four commutator gates 61, 73, 75 and 76.

It is now necessary to observe the pulses delivered to output wire 70, Fig. 9, so as to determine the speed of the wheel and when that is satisfactory to then detect the long space in the succession of flashes and the pulses derived therefrom so as to deliver to an output wire 71 (Fig. 10) forming the input to the binary counter Figure 9, only that train of pulses to be used for counting down the counter.

It will be noted in Fig. 10 that the wire 70 incoming thereto leads to a number of gates (G-1, G-2 and G-3), the first of which consists primarily of a condenser 100, a diode 101, a resistor 102 and a control resistor 103. Gate G-1 is said to be Open when its control is positive so that a positive pulse incoming to the condenser 100 will be passed by the diode 101 to the output of the gate in this case leading to the DMV 104. In the circuit of Fig. 10 this gate is normally open since the control resistor 103 is connected to the output C of a two input flip-flop which in the Off condition of the flip-flop is normally Up, that is, at ground potential.

The next gate, G-2, controlled by the DMV 104 is normally closed and the third gate, G-3, controlled by the output B of the flip-flop 77 is normally closed.

It may be noted at this point that the output of the gate G-3 leads to the base of a transistor 78 which is normally conducting. Thus when this gate G-3 becomes Open by reason of an On condition established in the flip-flop 77, a positive pulse will be passed to the base of transistor 78 which will have the effect of producing an inverted pulse in the conductor 79, that is, a transient movement from Up to Down. The recovery of the conductor 79 to an Up condition upon the termination of such a positive pulse passed to the base of transistor 78 will constitute a positive pulse passed both to the DMV 80 and to the base of transistor 81 under the proper conditions, when the flip-flop 82 is On.

Figure 11:
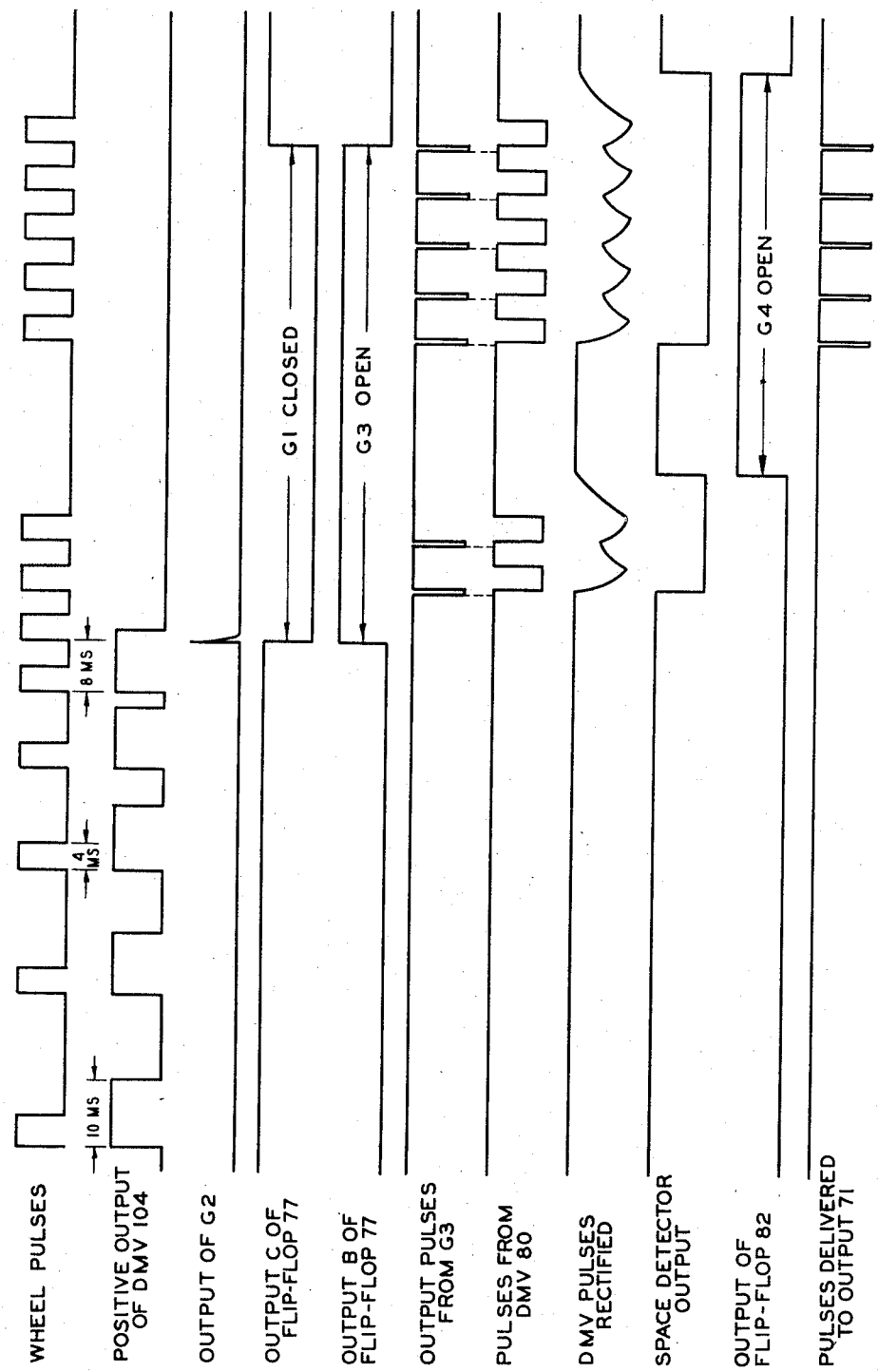
Fig. 11 is a set of graphs showing how the succession of pulses from a single wheel is processed by the circuitry of Fig. 10.

The operation of the circuitry of Fig. 10 is depicted by a set of graphs in Fig. 11. Thus when a solenoid such as the solenoid 63 in Fig. 9 is energized and the pin 64 is withdrawn from the wheel 65, this wheel is put into motion and as it accelerates will cause the production of a train of pulses over the output 70 and thus to the inputs of gates G-1, which is open, and G-2 and G-3, which are closed. Due to the fact that the wheel 65 is starting from a standstill these pulses will at first be spaced far apart but as the wheel accelerates they will occur at shorter intervals as depicted in the first graph of Fig. 11.

The speed detector actually consists of the DMV 104 and the flip-flop 77, for the DMV translates the leading edges of these wheel pulses into timed positive pulses at the collector of its Q-2 transistor, shown in the second graph of Fig. 11 to be positive pulses of about 10 milliseconds duration. This, it will be understood, is subject to adjustment by the changing of the value of the variable resistor 105 of Fig. 10. It will appear that the gate G-2 is thus opened on each operation of the DMV 104 but this gate is not opened as the wheel pulses are transmitted over the input 70, until the wheel comes up to speed and the spacing of the pulses becomes less than the duration of the positive output pulses of the DMV 104. Thus, as shown by the first two graphs, when another wheel pulse occurs before the DMV pulse has terminated and thus while the gate G-2 is still open, a positive pulse will be transmitted into the On input terminal of the flip-flop 77 as shown in the third graph. Thereupon the flip-flop 77 will operate and its output B will go Up and its output C will go Down as shown in graphs 5 and 4 respectively. Thus gate G-1 will be closed, gate G-2 will remain permanently closed and gate G3 will be opened. Positive pulses now appearing on conductor 70 will be passed by gate G-3 and will be inverted to appear as negative pulses on coductor 79 as shown in the sixth graph.

The gate G-4 fed from conductor 79 is closed at this time. Therefore the negative pulses on conductor 79 are fed into the input of the DMV 80 where this circuit is triggered by the trailing edges thereof and which in turn produces negative pulses as shown in the seventh graph. These negative pulses are fed to a rectifier point 83 where the normally charged 2 mf. condenser discharges during the existence of the pulse and then starts to recharge thereafter as depicted in the eighth graph.

The rectifier 83 is followed by a two stage amplifier comprising the transistors 84 and 85 and this amplifier translates the potential movement of the rectifier into the space detector output as depicted in graph 9. Thus when a gap occurs in the succession of the pulses shown in graph 1 and in graph 6 a movement from Down to Up occurs in the graph 9 which constitutes a positive pulse at the input of the flip-flop 82 so that gate 4 is opened. Thereupon further pulses incoming over the conductor 70 and shown in graph 1 are translated into the count down pulses transmitted through gate G-4 and thence over the conductor 71 to the counter of Fig. 5 and of Fig. 9 as depicted in graph 11.

When the counter is satisfied and on its last count produces a positive pulse on its output wire 54, the flip-flop 77 is turned off whereby gates G-2 and G-3 are closed. As the output from the DMV 80 goes Up the space detector output as shown in graph 9 goes Up and this triggers the flip-flop 82 a second time whereby the gate G–4 is closed, as shown in graph 10.

It may be noted that since the main components of the circuitry have a pair of transistors one of which is active in the normal or zero position of the component, a simple plurality of diode gates may interconnect a set zero conductor for each said component so that a single application of positive potential thereto will move all components to zero or starting condition.

Fig. 12 shows a modification of the circuitry whereby all the wheels may be started simultaneously thereby reducing the overall time for setting them by eliminating the acceleration time of the second, third and fourth wheels. In this arrangement an additional flip-flop for each wheel is used. These components 86 to 89 have their On inputs multipled to a common start wire 90, which like the start wire 91 is arranged by appropriate circuitry to be brought Up by computer or other means. When the start wire 90 is brought Up all four of the flip-flops 86 to 89 will be turned On whereby all four of the wheel stop pins, such as the pin 64, will be withdrawn from the associated wheel and thus all four wheels will be put in motion. At the same time the first commutator gate 92 will be enabled whereby the wire 94 will go Down to open a gate between the phototransistor 95 circuit and the amplifier 96 leading to the output wire 70. When the train of pulses transmitted over the wire 70 has counted the counter down and the counter output wire 54 has transmitted a positive pulse, the commutator gate 92 will be closed and the next one 98 will be opened. The ending of the negative output from gate 92 constitutes a positive pulse on wire 94 whereby the flip-flop 86 will be turned off and the wheel pin 64 will be plunged in between the wheel tabs to stop the wheel so as to display the digit counted off by the phototransistor 95. At the same time the gate opened by the connection 99 will be closed and the gate similarly controlled from the commutator gate 98 will be opened.

It may be noted in this arrangement shown in Fig. 12 that the phototransistors are reversed to what is shown in Fig. 9 since the opening of the gate from the phototransistor to the common conductor leading to the output amplifier 96 is controlled by a negative pulse. In the same manner and for the same reason the single shot multivibrator 113 is arranged to respond to a negative incoming pulse and to produce a positive outgoing pulse as in the arrangement of Fig. 9.

In the same manner each of the wheels will be set in turn and as each produces the proper number of pulses to operate the counter, its associated control flip-flop 86, 87 and 89 will be turned Off and the associated pin will be plunged in between the tabs of the wheel as described.

As the first wheel is stopped, the counter will be set for the next digit in the time used for detection of the long space so that the counting of the next digit will be carried out as described. The last control flip-flop 89 is switched off by the movement of the last of the four commutator gates, as the last digit is counted down.

What is claimed is:

1. A character display device consisting of a constantly rotating shaft, a plurality of wheels each having a series of characters on the tread thereof, said wheels being loosely mounted on said shaft, each said wheel being associated with said shaft by a slip clutch, a pin normally engaging each said wheel to prevent rotation thereof, each said wheel having a plurality of reflecting surfaces, a source of light and photoelectric means responsive to light from said source transmitted thereto by reflection from said reflecting surfaces, means for withdrawing said pin from engagement with said wheel to allow rotation thereof, and counting means responsive to said photoelectric means successively operated by passage of said reflecting surfaces into transient cooperative relationship with said photoelectric means for releasing said pin into engagement with said wheel when a given count is reached by said counting means.

2. A character display device as claimed in claim 1, in which means are provided to preset said counting means to display various characters at will.

3. A character display device as claimed in claim 1, in which said reflecting surfaces are placed about said wheel to provide a succession of a given number of equally spaced pulses except for a gap in said succession to provide a signal to start counting.

4. A character display device as claimed in claim 1, in which means is provided to establish cooperative relationship between said photoelectric means and said counting means responsive to a signal indicating a speed of rotation of a said wheel at substantially the speed of rotation of said shaft.

5. A character display device as claimed in claim 1, in which means is provided to establish cooperative relationship between said photoelectric means and said counting means responsive to a speed indicating signal, and means for producing said signal consisting of a pulse stretcher constructed and arranged to produce an output pulse exceeding by a minimum amount the interval between succeeding pulses transmitted by said photoelectric means when said wheel has attained substantially the same speed of rotation as said shaft, means being provided to compare a said stretched pulse with said pulses transmitted by said photoelectric means for measuring the intervals therebetween.

6. A character display device as claimed in claim 1, in which said photoelectric means produces a train of pulses for controlling said counting means, a transmission path for said pulses including two gates in multiple, one of said gates being normally open and the other being normally closed, a pulse stretcher in said transmission path beyond said normally open gate, said pulse stretcher having an output for controlling said normally closed gate and means for transmitting pulses from said photoelectric means to said counting means responsive to the transmission of a said pulse when both of said gates are simultaneously open.

7. A character display device as claimed in claim 1, in which said photoelectric means produces a train of pulses for controlling said counting means, a transmission path for said pulses including two gates in multiple, one of said gates being normally open and the other being normally closed, a pulse stretcher in said transmission path beyond said normally open gate, said pulse stretcher having an output for controlling said normally closed gate, a third gate normally closed for extending said transmission line to said counting means, a flip-flop for controlling said first and said third gates and means for triggering said flip-flop responsive to a said pulse being transmitted over said transmission line while said first and said second gates are simultaneously open.

8. A character display device as claimed in claim 1, in which said photoelectric means produces a train of pulses for controlling said counting means, said train of pulses consisting of a plurality of pulses regularly spaced with a space containing no pulses preceding said train, a transmission path for said pulses including a first normally open gate and and a second normally closed gate, means reached through said second gate responsive to a predetermined speed of rotation of a said wheel for closing said first gate, a third gate, normally closed and responsive to said speed responsive means for opening said third gate for extending said pulse transmission path to means for detecting said space before said train of pulses and a fourth gate normally closed for further extending said pulse transmission path to said counting means, said fourth gate being under control of said space detector.

9. A character display device as claimed in claim 1, in which said photoelectric means produces a train of pulses for controlling said counting means, said train of pulses consisting of a plurality of pulses regularly spaced with a space devoid of pulses preceding said train, means for detecting said space consisting of a pulse stretcher responsive to pulses of said train and means for integrating stretched pulses regularly following one another into a single signal, whereby relaxation of said integrating means in said space before said train of signals may be used to extend a path for the transmission of said pulses to said counting means.

10. A character display device as claimed in claim 1, in which said photoelectric means produces a train of pulses for controlling said counting means, said reflecting surfaces being so placed on said wheel to produce trains of regularly spaced pulses separated by spaces equal in length to a small plurality of pulses, circuit means for integrating the pulses of a train into a single signal whereby the output of said integrating means would produce a train of pulses each equal in length to a train of said photoelectric produced pulses, and means including a gate responsive to said integrating means for extending a path for said photoelectric pulses to said counting means.

11. A character display device as claimed in claim 1, in which said characters on the tread of each said wheel are spaced at regular intervals thereon with a space equal to a plurality of said intervals separating the ending and the beginning of said succession of characters, said reflecting surfaces being in one to one correspondence therewith, a transmission path for transmitting pulses derived by said photoelectric means in cooperative relationship with said reflecting surfaces and means for detecting said space in said succession of said reflecting surfaces including a pulse stretcher responsive to said pulses, a rectifier responsive to said pulse stretcher and an integrating circuit responsive to said rectifier for converting a regular and unbroken succession of pulses into a single signal, whereby the beginning of such a single signal will constitute a signal to transmit said pulses to said counting means.

References Cited in the file of this patent

UNITED STATES PATENTS

| | | |
|---|---|---|
| 2,324,778 | Julius et al. | July 20, 1943 |
| 2,456,226 | Thorpe | Dec. 14, 1948 |
| 2,617,870 | Kern | Nov. 11, 1952 |
| 2,675,961 | Larsen | Apr. 20, 1954 |
| 2,697,551 | Rench | Dec. 21, 1954 |
| 2,736,017 | Marlowe et al. | Feb. 21, 1956 |
| 2,757,862 | Boyden et al. | Aug. 7, 1956 |
| 2,759,672 | Simonds et al. | Aug. 21, 1956 |
| 2,784,397 | Branson et al. | Mar. 5, 1957 |
| 2,827,626 | De Motte | Mar. 18, 1958 |
| 2,840,807 | Todd et al. | June 24, 1958 |
| 2,843,840 | Brinster et al. | July 15, 1958 |
| 2,852,767 | Foller et al. | Sept. 16, 1958 |